Patented Dec. 31, 1935

2,026,034

UNITED STATES PATENT OFFICE 2,026,034

FOOD PRODUCT AND METHOD OF MAKING THE SAME

Edmund L. Griffith, Freeport, Ill.

No Drawing. Application September 29, 1933,
Serial No. 691,507

5 Claims. (Cl. 99—11)

This invention relates to cereal foods such as breakfast foods, and contemplates novel products and novel methods for preparing the same.

It has been found that food eaten by the average individual is deficient in roughage, that is, it does not contain sufficient indigestible material to bring about normal elimination. For this reason a good many foods have appeared on the market, principally cereal foods, aimed to supply this deficiency. Among the most common are bran and cereal foods containing considerable quantities of bran. However, while these materials provide the necessary bulk, they are far from satisfactory for the purpose. Because of its physical nature, the indigestible residue of the bran tends to pack in the bowel, thus making elimination difficult. This is to a greater or lesser degree true of substantially all materials having large residues. A further objection to many of these foods is the fact that they so lack palatability that people object to eating them. This is due both to their flavor and to their physical state. If we consider bran, for example, which is possibly the most efficient of this type of cereal foods, we note that its flavor is not particularly inviting. Furthermore, it exists in the form of small soft flakes and when treated with sugar and cream in the usual way, results in a soft mushy mass which is far from being an inviting food.

Another objection to this type of food, and particularly bran and similar materials of fine particle size, is the fact that people with artificial dentures or plates have difficulty in eating the cereal because of the fact that the small particles of the cereal tend to creep under the denture. Many of these people are therefore deprived of the beneficial effects of these cereal roughages.

A principal object of the invention is to provide a cereal food of the type having a substantial amount of indigestible residue carrying a material adapted to prevent packing of this residue in the bowel.

A further object of the invention is the provision of a cereal food of the type having a substantial amount of indigestible residue, the particles of the cereal having a coating of wax and mineral oil.

A further object of the invention is the provision of a cereal food of the type having a substantial amount of indigestible residue wherein the particles of cereal are treated to enhance their palatability and carry a coating of wax and mineral oil for the purpose of retaining the flavor and preventing packing of the residue in the bowel.

I have also aimed to provide a cereal food wherein the particles of cereal are toasted and subsequently treated to prevent the absorption of moisture so that the cereal will retain its crispness.

A still further object of the invention is the provision of a method for preparing a cereal food wherein the particles of cereal with or without a flavoring material are toasted and then coated with a material adapted to prevent packing of the residue in the bowel, to prevent the absorption of moisture, and to retain the flavor.

A still further object of the invention is to provide a cereal food of the type of a substantial amount of indigestible residue wherein the particles are coated with wax and mineral oil and are bound together in cake form.

Other objects and attendant advantages will become apparent to those skilled in the art from the following description.

In the practice of my invention for the purpose of producing the food product herein disclosed, I take ordinary bran such as is commonly sold for human food, and add thereto a suitable flavoring material in the form of a liquid. I have found it convenient to add a fruit syrup on the order of that commonly used in soda fountains. It will be seen that the particular flavor may be varied to suit the taste. I find it advantageous, however, for the syrup to contain a certain amount of sugar which aids in giving the product crispness when toasted, as will presently be described. This syrup is thoroughly mixed into the bran so that each particle will receive a certain amount of the flavoring matter and the sugar. Thereafter the mass is placed in an oven and dried at a low temperature. I have found that a convenient temperature is about 70° centigrade, but a wide range of temperature can be used, the essential thing being that it should not be so high as to char the material or to drive off the flavor. The temperature only needs to be sufficiently high to evaporate the moisture and impart crispness to the particles. It will be seen that in this way when the moisture is evaporated the sugar crystallizes onto the particles, which tends to give crispness thereto. Likewise, the moisture is evaporated from the particles of bran itself, which further tends to make the particles crisp. While the mass is still hot, I add thereto a mixture of paraffin and mineral oil, mixing this coating material into the mass until each particle of bran has been thoroughly coated. The coating material should be added hot so as to retain its fluidity.

The coating material is made by melting tasteless refined paraffin and adding thereto colorless and tasteless mineral oil. I aim to add sufficient mineral oil to soften the paraffin but not sufficient to render the paraffin liquid at atmospheric temperature. I have found that with the particular types of paraffin and mineral oil I have used, one-quarter pint of mineral oil to one-quarter pound paraffin produces about the desired characteristics.

I have found that suitable proportions of the above ingredients are about as follows, though these may be varied within wide limits depending upon the type of bran, the syrup, etc.

| | |
|---|---|
| Bran | 1½ pounds |
| Fruit syrup | ½ pint |
| Paraffin | ¼ pound |
| Mineral oil | ¼ pint |

When the mass thus treated has cooled to atmospheric temperature, the coating material will have solidified producing a soft wax-like coating over the surface of the particles. This serves to thoroughly seal each particle so as to prevent escape of the flavoring matter or deterioration thereof, effectively sealing the flavor into the particles. Likewise this coating prevents access of moisture to the particles so that they indefinitely retain their crispness. It will be noted also that since this coating contains mineral oil, each particle carries a small amount of mineral oil, which acts, under the temperature of the body, to maintain the indigestible residue of the bran in a soft and plastic form in the bowel.

The method is by no means limited to the use of bran, but may also be applied to advantage to other types of cereal foods, such as corn flakes, rolled oats, and other composite and puffed cereal foods. While some of these foods may not be of a nature which have a large amount of indigestible residue, the coating of paraffin and mineral oil serves to seal in the flavor and retain the crispness of the product. The coating may be applied to advantage even when no added flavor is employed for the purpose of retaining the crispness of the product, and to act as a lubricant in the intestines.

The material produced by the method above disclosed consists of cereal particles which have been dried or toasted and rendered crisp, either with or without a flavoring material and carries a coating consisting of a mixture of paraffin and mineral oil. Other foreign flavoring materials may be added to the product as desired, such as nuts and the like.

As above pointed out, cereal foods of this character cannot ordinarily be conveniently eaten by those having artificial dentures or false teeth, and they are thereby many times deprived of the beneficial effects of this type of food. This is largely due to the fact that small particles of bran or other cereal food tend to get under the denture, occasioning considerable discomfiture. I have found that if the material above described is compacted into cake form and held in this form by means of a binder, the tendency of the particles to pass under the denture is largely eliminated and people having full dentures may eat this type of cereal without any particular difficulty.

Another advantage of the cake form lies in the fact that it may be easily transported about by carrying in the purse or bag for those people who find it necessary to eat this type of food at intervals during the day. This product is made by adding a binding material to the loose cereal previously described, which binding material may advantageously consist of wheat flour. A thick paste is made of wheat flour, the paste being made just as thick as possible, so thick that it will barely hang together. The treated bran is then kneaded into the paste and the resultant material is rolled out into a sheet and is cut up into the desired sizes to form a cake or a cracker depending upon the thickness. The cake or cracker may then be dried at moderate temperatures if desired so as to produce a crisp cracker or cake. However, for those having artificial dentures, it is many times advisable to leave the cake in the moist form to facilitate the mastication thereof and prevent the subsequent formation of small particles.

Attention is directed to the fact that I have provided a cereal food which carries, as a surface coating, a mineral lubricant which corrects the tendency of materials of this kind to pack in the bowel due to the absorption of fluids therefrom in the intestine. This coating material also serves to retain the flavor in the particles of cereal and to prevent the absorption of moisture thereby so that the cereal does not lose is crispness. I have provided a cereal food of the bran type having a substantial amount of indigestible residue wherein the food has a palatable flavor and a crispness heretofore not obtainable in similar foods. I have also provided this food in the form of cakes wherein the particles are held together during the mastication thereof so that the tendency of the particles to be carried under artificial dentures is substantially eliminated.

I have also provided a method for the manufacture of a cereal food wherein particles of cereal either with or without flavoring material are provided with a coating of mineral lubricant held in place by means of wax, the coating serving to retain the flavor in the food particles and prevent the absorption of moisture to destroy the crispness thereof.

While I have thus described a specific embodiment of my invention I am aware that numerous alterations and changes may be made therein without departing from the spirit of the invention, and I do not wish to be limited except as required by the prior art and the scope of the appended claims, in which—

I claim:

1. A method of making a flaky cereal food comprising treating flaky cereal particles of a character having a substantial amount of indigestible residue with a coating material solid at normal atmospheric temperature and sufficiently soft at body temperature to act as an intestinal lubricant including wax and mineral oil, mixing the same while warm to cause the said mixture to thoroughly coat each particle of the cereal, and cooling the product to solidify the coating.

2. A method of making a cereal food comprising treating cereal particles of a character having a substantial amount of indigestible residue with a flavoring syrup, drying the particles thus flavored to produce crisp flakes, treating the particles with a coating material solid at normal atmospheric temperature and sufficiently soft at body temperature to act as an intestinal lubricant including wax and mineral oil, mixing the same to cause the said mixture to thoroughly coat each particle of the ceretal, and cooling the product to solidify the coating and form a dry flaky product.

3. A method of making a cereal food comprising treating cereal particles of a character having a substantial amount of indigestible residue with a coating solid at normal atmospheric temperature and sufficiently soft at body temperature to act as an intestinal lubricant including an indigestible wax and mineral oil, mixing the same to cause said mixture to thoroughly coat each particle, mixing the particles thus formed with an edible binder with which said wax is substantially immiscible, and forming the mass into desired shapes.

4. A crisp flaky cereal food comprising particles of cereal of a character having a substantial amount of indigestible residue, said particles carrying a coating of paraffin wax and mineral oil in quantity sufficient to act as an intestinal lubricant said wax and mineral oil being proportioned to be solid at normal atmospheric temperature and sufficiently soft at body temperature to act as an intestinal lubricant.

5. A crisp flaky cereal food comprising particles of cereal of a character having a substantial amount of indigestible residue, said particles carrying a crisp flavoring material and having a coating of paraffin wax and mineral oil in such quantity as to act as an intestinal lubricant said wax and mineral oil being proportioned to be solid at normal atmospheric temperature and sufficiently soft at body temperature to act as an intestinal lubricant.

EDMUND L. GRIFFITH.